United States Patent
Luttmer

(10) Patent No.: US 9,007,657 B2
(45) Date of Patent: Apr. 14, 2015

(54) METHOD FOR MAKING A COLOR TRANSFORM

(71) Applicant: Océ-Technologies B.V., Venlo (NL)

(72) Inventor: Maurice L. M. Luttmer, Velden (NL)

(73) Assignee: Oce-Technology B.V., Venlo (NL)

( * ) Notice: Subject to any disclaimer, the term of this patent is extended or adjusted under 35 U.S.C. 154(b) by 0 days.

(21) Appl. No.: 14/295,980

(22) Filed: Jun. 4, 2014

(65) Prior Publication Data

US 2014/0368844 A1    Dec. 18, 2014

(30) Foreign Application Priority Data

Jun. 18, 2013  (EP) ..................................... 13172434

(51) Int. Cl.
*G06K 15/02*    (2006.01)
*H04N 1/60*     (2006.01)

(52) U.S. Cl.
CPC ............ *G06K 15/1878* (2013.01); *H04N 1/603* (2013.01); *H04N 1/6058* (2013.01)

(58) Field of Classification Search
None
See application file for complete search history.

(56) References Cited

U.S. PATENT DOCUMENTS

| | | | |
|---|---|---|---|
| 7,847,974 B2 * | 12/2010 | Dalrymple et al. | 358/1.9 |
| 2006/0012811 A1 * | 1/2006 | Dalrymple et al. | 358/1.9 |
| 2006/0193018 A1 | 8/2006 | Ito et al. | |
| 2007/0052986 A1 * | 3/2007 | Spaulding et al. | 358/1.9 |
| 2007/0236759 A1 * | 10/2007 | Ohga | 358/518 |
| 2009/0310157 A1 | 12/2009 | Wada | |
| 2010/0092081 A1 | 4/2010 | Sakurai | |
| 2010/0253698 A1 | 10/2010 | Chang et al. | |
| 2012/0224199 A1 | 9/2012 | Fukuda et al. | |
| 2013/0100465 A1 | 4/2013 | Fischer et al. | |

FOREIGN PATENT DOCUMENTS

| | | |
|---|---|---|
| EP | 0 763 927 A1 | 3/1997 |
| EP | 1 392 050 A2 | 2/2004 |
| EP | 1 427 184 A2 | 6/2004 |

* cited by examiner

*Primary Examiner* — Kimberly A Williams
(74) *Attorney, Agent, or Firm* — Birch, Stewart, Kolasch & Birch, LLP

(57) ABSTRACT

A method for making a color transform for an output device is provided. The color transform represents a correspondence relation between a first and a second color space. Each of the two color spaces involves a number of color channels and the color channels of the second color space control the colorants in the output device. An excess relation for the color channels of the color space associated with the output device is established and only color points in the second color space wherefor a sum of the excess values related to the color point is lower than a predetermined limit, are included in the color transform. This enables to adapt the shape of a color gamut to a behavior of the colorants and enhances the flexibility in making a color transform for various print processes.

9 Claims, 3 Drawing Sheets

METHOD FOR MAKING A COLOR TRANSFORM

BACKGROUND OF THE INVENTION

1. Field of the Invention

The present invention relates to a method for making a color transform for an output device, the color transform representing a relation between a first and a second color space, each color space comprising color points for defining a color, each color point comprising a number of color channel values, the color channel values of the color points in the second color space controlling one or more colorants in the output device. The present invention further relates to a computer program product comprising instructions for executing the invented method.

2. Description of the Related Art

Reproductions of images involving color are often sensitive to the amount of colorants that are used to render an image on a receiving medium. Furthermore, the properties of the colorants, comprising both coloring material, such as dye or pigment, and a carrier, such as resin, water or another solvent, the properties of the receiving medium, such as paper or polymer film, and the applicating conditions, such as the temperature and humidity of the environment, all affect the output colors of a color imaging device, such as a printer. Colorants are applied either by varying a quantity of material emitted on a predefined position of the receiving medium, or by varying a number of fixed quantities of material around a predefined position, both identifiable as an adjustable colorant amount for an image position, controlled by a value of a control variable, sometimes referred to as a code value. If, for example, the colorant is ink, a colorant amount may be adjusted by varying the volume of an ink drop on a predefined position, or by the amount of ink drops with a fixed volume around this predefined position. Also combinations of these two variations are possible.

A single control variable, or a single color channel, is sufficient for an output device for monochrome reproductions, but for full color reproductions at least three color channels are necessary and most commonly, four color channels are used. An output device applies at least as many colorants as the number of available color channels. Each control variable in a color channel may be used for controlling a single colorant, indicating a value in a range from a minimum amount of colorant, most often equivalent to no colorant, to a maximum amount of colorant. A control variable may also be used to control more than one colorant, e.g. in the case of a combination of a light, or diluted, and a dark, or concentrated, colorant for varying an output color. A separation of the control variable to control the individual amounts of the two colorants is made within the output device. For color controlling purposes, such as by an external print controller, only the available color channels are relevant.

A color imaging device prints a digital image that is derived from print job data. A print job that is sent to the imaging device is first interpreted by a print controller, thereby converting colors as defined in the print job in a first color space to color channel values of a color point in a second color space, the color channel values being appropriate for obtaining a color by the imaging device corresponding to the defined color in the print job. In general, in the processing of digital images, colors may have to be converted using a pre-defined color transform, that represents a correspondence relation between two color spaces. Each color space comprises color points having a number of color channel values for defining a color. In a color space, a gamut is the set of colors that is available by a combination of color channel values in a color point.

Digital images use different combinations of channels for defining a color of image elements, such as pixels. The channels in a color imaging device, that is configured to make a reproduction of a digital image, may or may not correspond to the channels of an input image. An example is the common use of the three channels R, G, and B, also known as a red, green and blue channel, that define a color for each pixel of a raster image, and the four channels C, M, Y, and K, also known as a cyan, magenta, yellow and black channel, that are used to control the application of colorants in a printer. Each of these combinations of color channels is associated with a customary scheme for color generation by mixing the various channels. In the case of RGB-channels, additive mixing is usual, leading to a white color when all the channels have their maximum value, whereas in the case of CMYK-channels, subtractive mixing is conventional, leading to a black color when all the color channels have their maximum value. In order to accommodate the various sets of color channels, digital print systems comprise a conversion module for converting the channel control values of each pixel of the input image into channel control values that are applicable in the imaging, or output, device. This conversion module uses a color transform based on calibration data for characterising the input color space of the digital image and the output color space of the imaging device. In the calibration process, a color is established in its device dependent set of control values and related to a color definition in scientific, device independent variables, such as CIE XYZ or CIE L*a*b. An often used model for color matching is the combination of two characterising color profiles, one for the input side and one for the output side of the conversion, as prescribed by the International Color Consortium (www.color.org). These profiles are linked through a profile connecting space, such as the CIE XYZ or CIE L*a*b* color space, thereby obtaining a conversion table, also known as a device link or color transform, for the conversion module. The size of the conversion table is not fixed and the conversion module is capable to perform the necessary interpolations to convert input values that are not on a grid point of the table. Each profile defines a gamut, which is formed by the colors that may be represented by the color points in the device dependent color space. In general, a gamut is the set of colors that may be defined in a color space. A gamut may be limited by a predefined range for the color channels, such as e.g. by the limited range of 8-bit digital values. For colors outside the gamut, an alternative color point may be used. This alternative color point is also related to another color, a color within the gamut. The process for establishing a relation between a color outside the gamut and a color point that represents a color within the gamut is called gamut mapping.

A color profile, and in general a color transform, may be made by associating color channel values for an input or output device and their corresponding colors with their device independent color values in a black-box analysis. This means that the further processing of the color channel values with a device remains hidden during the making of a color profile. For a scanner, this comes down to determining the response in the color channels of the scanner to a number of color areas on a test chart. For a printer, this comes down to printing a test chart with a number of areas, each area having pixels with stimulant color channel values, on a representative medium and optically measuring the output colors of these areas. No further analysis of the color filters in a light sensitive element of the scanner or of the application of colorants in the printer is made. A resulting profile defines a relation between color channel values of the output device, and corresponding colorimetric values, in both conversion directions.

Not all media that receive colorants for the reproduction of an image in a printer, are capable of digesting large amounts of colorants. For this reason many profiling methods offer the possibility to limit the total ink coverage (TIC) or the total area coverage (TAC). This feature may also be used to reduce the amount of ink for economic reasons. For example, in a four channel print process, each channel is controlled from 0% to 100%, or from 0 to 1. If a color point comprises 100% for each channel, this results in a total area coverage of 400%. In many color management systems, it is possible to limit this value to a lower value, e.g. 250% or 320%, to prevent exceeding the technical limitations of the print process or to make a less expensive print by using less ink in high coverage areas, in dependence on the receiving medium and other process parameters. A limitation of the total coverage affects the gamut as, in addition to colors for which no color point exists, also colors for which the color point exceeds the established TAC limit, are excluded from the gamut. Therefore, the gamut shrinks by using a TAC limit.

It has been found that, by establishing a TAC limit, also the shape of the gamut changes relative to the shape of the gamut without a TAC limit. This has a considerable effect on the performance of gamut mapping for out of gamut colors, since colors outside the gamut without a TAC limit will often be mapped on the contour of the gamut. This is the part of the gamut where most of the colors transgressing the TAC limit are found. The colors on the gamut boundary are selectively eliminated, depending on the sum of the color channel values of the color point that produce these colors. Only colors that result from combinations of colorants for which the sum of the color channel values is lower than the TAC limit, are maintained and only these colors will be available for mapping out of gamut colors to.

A method for profiling, or more generally, a method for making a color transform, may be used for many different print processes or image processing purposes in which color channel values lead to colors in different ways. However, it has been found that in most processes, the use of a TAC limit leads to a concave gamut shape, wherein the parts of the gamut in which colors are composed of a single colorant or a few colorants stand out relative to colors using all colorants, whereas for many gamut mapping algorithms a convex shape is preferred.

Hence, a problem exists in controlling the volume and the shape of a gamut in a method for making a color transform, that relates different color channel values to each other, when a limit is imposed that restricts the available color points in the output color space.

An object of the present invention is to provide a method for making a color transform wherein control means are available for influencing the volume and the shape of the gamut in the output color space.

SUMMARY OF THE INVENTION

According to the present invention, the above mentioned object is achieved by a method for making a color transform, the method comprising the steps of: obtaining a set of first color points in the first color space and a set of corresponding second color points in the second color space, wherein a first and a second corresponding color point define a corresponding color; establishing an excess relation for relating a color channel value of color points in the second color space to an excess value; and making the color transform for a gamut of color points in the second color space by relating color points in the first color space to color points in the second color space, wherein a color point is only included in the gamut if a sum of the excess values related to the color channel values of said color point is lower than a predetermined limit. The excess relation may be established by defining a number of points, that relate a control value to an excess value and by interpolating in-between these points, either linearly or according to a spline function or otherwise. Another method for defining the excess relation is to make a table defining an excess value for every discrete control value. The excess value attributes a weight to an individual control value, thereby evaluating its contribution to a limiting value. It was found that the shape of the gamut is influenced by the relation between the excess value and the control value, whereas the volume of the gamut is influenced by the predetermined limit of the sum of the excess values. For example, the gamut may be given a somewhat convex shape in order to improve the behavior of a gamut mapping algorithm for associating device values to colors outside the gamut. Furthermore, the excess relation may be used to limit an amount of colorant associated with a control value. The additional control of an excess relation in making a color transform provides a way to discriminate color points from the gamut in an output color space such that the shape of the gamut is affected.

In a further embodiment, a gamut mapping algorithm is used to relate color points in the first color space to an alternative color point in the second color space, if the corresponding color point in the second color space is not available, because the sum of the excess values related to the color channel values of the corresponding color point is not lower than said predetermined limit. By applying one algorithm both for colors for which no color point in the second color space exists and for colors for which such a color point exists, but is not available due to the limitation by the sum of the excess values, a continuous mapping of out of gamut colors is obtained.

In a specific embodiment, the second color space is associated with an output device for applying one or more colorants in relation to a color channel value of a color point in the second color space, and wherein the excess relation is based on a relation between an amount of colorant and a color channel value. The amount of colorant often depends in a non-linear way on the color channel value. This is the case if a single colorant is controlled by the color channel value, but it is also the case if more than one colorant is controlled by the single color channel value. In the case a color imaging device is characterized as an output device, a measurement of the amount of colorant may be used as supplementary input, in addition to an optical measurement of colors.

In a further embodiment, the color transform is a color profile, the first color space is a device independent color space, and the method comprises the additional steps of printing a predefined set of color points in the second color space on the output device to obtain the set of corresponding second color points and measuring the printed colors to obtain the set of first color points. The color profile relates combinations of the color channel values to a color that results from these combinations. The predefined set of color points in the second color space is only a very limited subset of all possible combinations. The set may be generic, applicable for all kind of print processes, or it may be specific for a class of print processes. In the first case, the set is usually larger than in the second case.

In a further embodiment, said predetermined limit depends on a print condition. A print condition is a parameter derived from a print job, such as a specific receiving medium on which the image data of the print job is printed or a required print quality.

Further details of the invention are given in the dependent claims. The present invention may also be embodied in a computer program product, including computer readable code embodied on a computer readable medium, said computer readable code comprising instructions for executing the steps of the invented method.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF EMBODIMENTS

Figure 1:
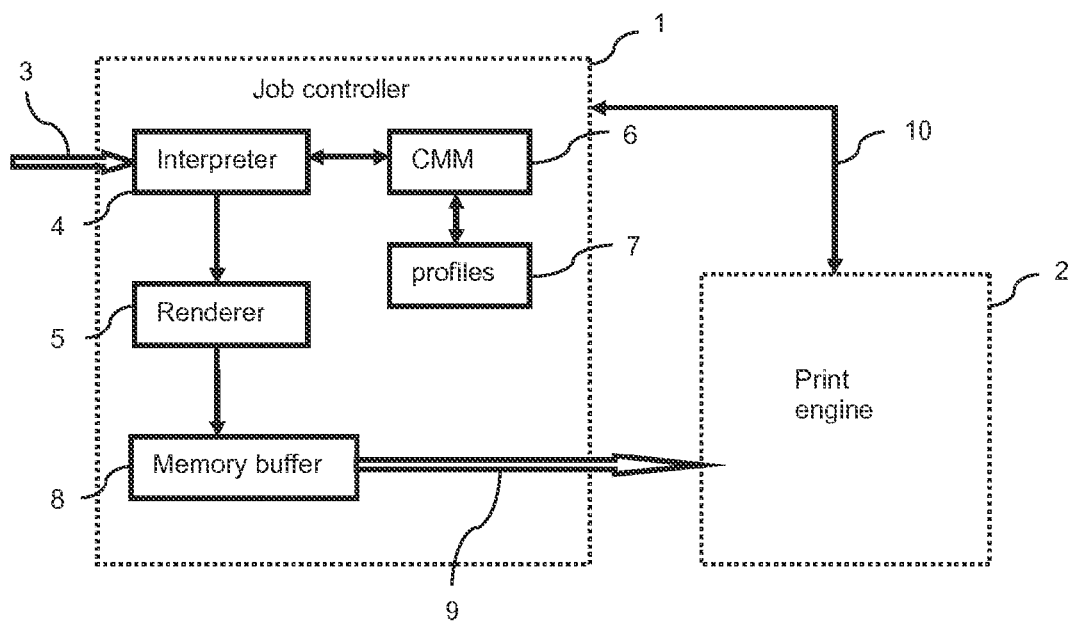
FIG. 1 is a job controller with a print engine in which an embodiment of the method according to the present invention is applicable.

The present invention will now be described with reference to the accompanying drawings, wherein the same or similar elements are identified with the same reference numeral.

FIG. 1 is a print system comprising a job controller 1 and a print engine 2. The print engine comprises a print process that applies four ink colorants. Alternatively, toner or any other material for marking an output medium may be used in the print process. Another number of colorants is also possible. The job controller receives data for a print job through its network connection. This is functionally indicated by the data flow 3. The data in the print job comprises both page description elements in a conventional page description language (PDL), such as PostScript, PCL or PDF, or, alternatively, raster image information in a standard format, such as JPEG or TIFF, as well as job information comprising information about the way the page data is to be printed, such as the type of receiving media that is to be used, the number of sides to be printed, the binding edge, and the finishing method. In the job controller, the input data is converted by the interpreter module 4 to graphic elements that are passed to the renderer module 5. The interpreter module 4 engages a color management module (CMM) 6 to convert colors as defined in an input color space, which is a color space that is used in the input data, to an output color space, which is a space of the device channel values for the print engine. The CMM 6 uses therefor profiles 7 that contain tables that have been set up by color calibration tooling. In this embodiment, a color calibration tooling according to the present invention is used. Job information is used by the job controller and eventually passed as control information to the print engine 2 through a control connection 10. This control connection 10 is also used by the print engine 2 to convey its status to the job controller. The output of the renderer is stored in a memory 8 as a raster image, preferably in a compressed form. In this configuration, the job controller controls which images are sent from the memory buffer to the print engine 2 through data connection 9, either in compressed form, when the print engine comprises a module for decompressing the image data, or in uncompressed form, in which case the image data may be uncompressed just before transmission.

Print engine 2 is configured to accept raster images with pixels having four channels that combine according to a familiar CMYK model. Each channel comprises a control value having a discrete value, associated with an amount of colorant in between a minimum and a maximum amount of colorant, the discrete values being distributed over the range in a way to minimize discrete steps in a resulting color. In a CMYK-space, the gamut is a 4-dimensional body, analogous to a 3-dimensional cube. In a device independent color space, such as CIE L*a*b*, the gamut is a more irregular shaped 3-dimensional body. For clarity, in FIG. 2, a 2-dimensional cross section of a color space, comprising two color channels is shown. On a horizontal axis 11, a control value for a first color channel is shown in the range of 0.0, representing a minimum colorant amount, usually indicating that no colorant is applied, to 1.0, representing a maximum colorant amount to be applied, and on a vertical axis 12, a control value for a second color channel is shown. In a digital representation, the discrete control values are represented by integers from 0 to a maximum, often 255 when 8 bits are used for each control value. If the colorants are applied without restrictions, the 2-dimensional gamut in this example would be the full square of FIG. 2. Further color channels extend the gamut in other dimensions, but two color channels are sufficient to describe the invention. The use of two color channels is for illustration purposes only, as it is understood that no full color printer can be operated with only two color channels.

Figure 2:
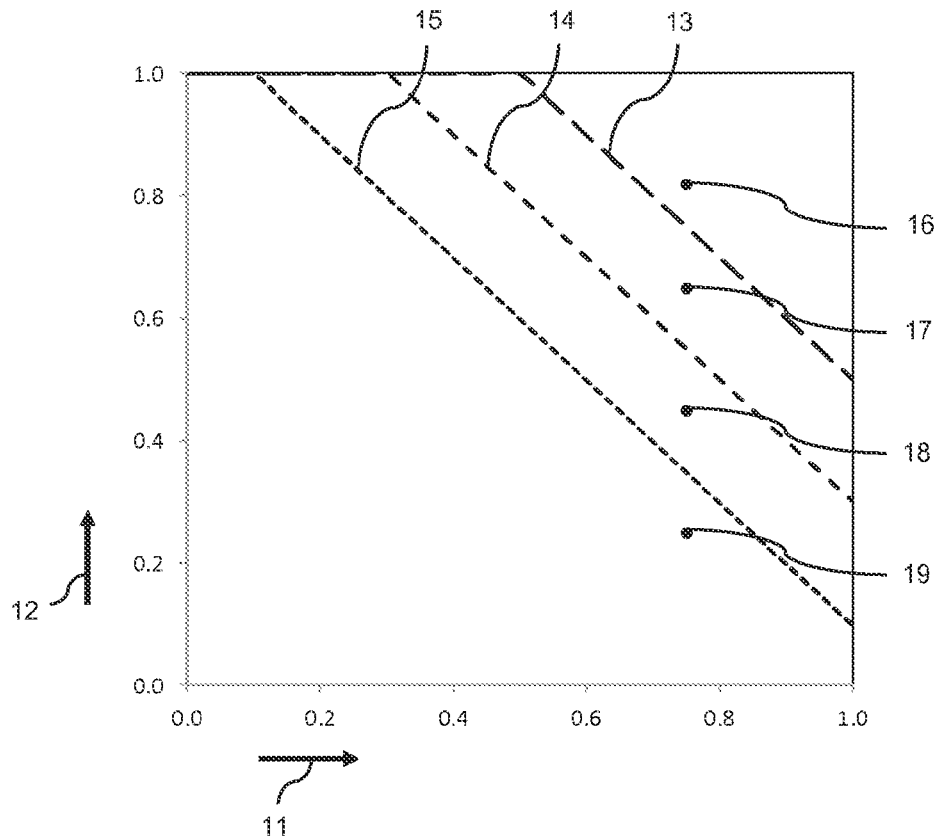
FIG. 2 shows a graph of available color points having two channels.

According to the prior art, in order to limit the total amount of colorant, a color channel value in the gamut of FIG. 2 is limited by imposing a total area coverage (TAC). A TAC involves a limit to the sum of the color channel values. Three possibilities for a resulting gamut shape are indicated by lines 13, 14, and 15, respectively limiting the sum of the two control values to 1.5, 1.3, and 1.1, or 150%, 130%, and 110%. Color point 16 is a point within the full gamut without limitation, but is outside the gamut limited by a TAC of 1.5. The color points 16, 17, 18, and 19 all comprise a first color channel value of 0.75 and a varying second color channel value. All these points result in a composed color in a printing device. Only color point 19 is within the gamut with a TAC of 1.1. Although the size of the gamut is controlled by the TAC value, no further possibility exists to influence the shape of the gamut.

Figure 3:
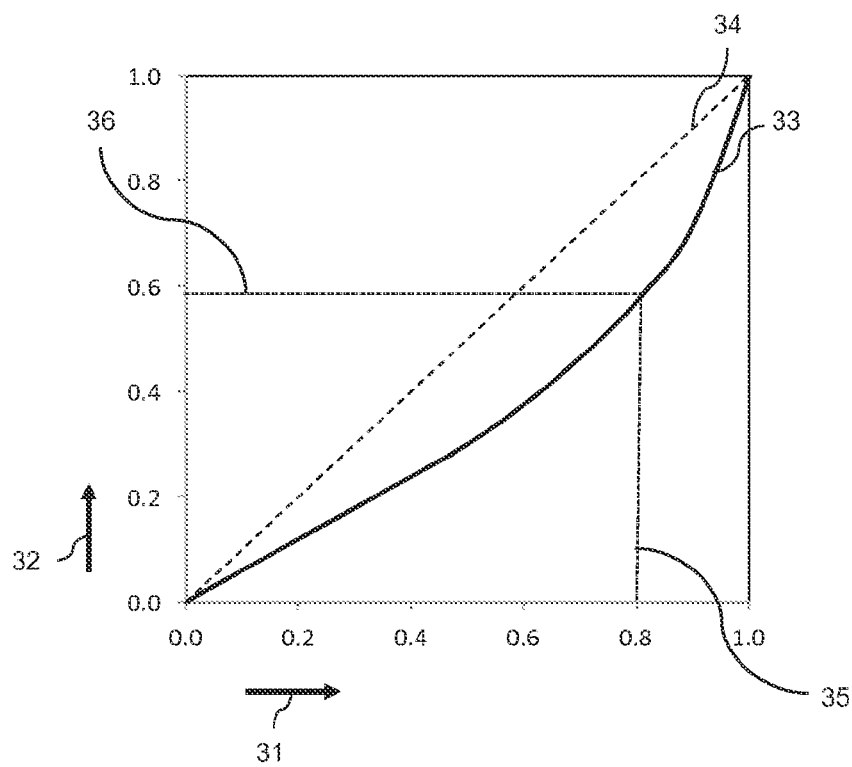
FIG. 3 shows an applied relation between a color channel value and an excess value.

According to the present invention, an excess relation is introduced, relating a color channel to an excess value. In FIG. 3, an example of an excess relation is shown. On a horizontal axis 31, a control value of a single color channel is between 0 and 1. On a vertical axis 32, an excess value in the range of 0 to 1 is shown. Line 33 represents a relation between a control value and a corresponding excess value, that is obtained by experimentation. As an example, a control value 0.8 (line 35) corresponds to an excess value 0.59 (line 36). The control value determines the amount of colorant that is applied for a color, but the excess value is used in deciding whether a device value is within or without a TAC-limited gamut. A control value may be used by a print engine either for a single colorant or for multiple colorants, depending on the way a print engine applies the available colorants. Line 34 is shown for reference, in order to display how much the excess value differs from the control value.

Figure 4:
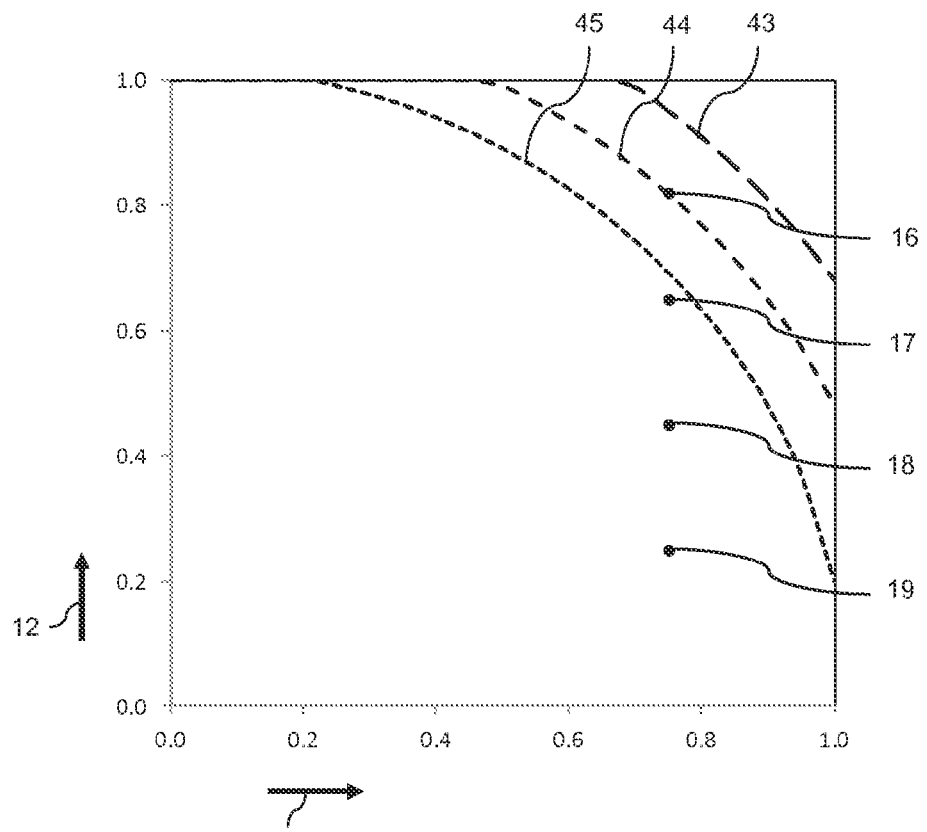
FIG. 4 shows available color points having two channels limited according to the invented method.

In FIG. 4, the gamut for the two color channels of FIG. 2 is limited by application of the excess relation in FIG. 3 to each of the two color channel values. The sum of the excess values associated with the control values is bounded to the same TAC values as before. The boundaries of the resulting gamuts are shown by the lines 43, 44, and 45. As can be seen, the gamuts are larger compared to the gamuts in FIG. 2 with a similar TAC value. Furthermore, the gamuts have a convex shape, which is advantageous when gamut mapping is applied to relate colors outside the gamut to a combination of color channel values. Also shown in FIG. 4 are the same four color points 16, 17, 18, and 19 as in FIG. 2, that comprise a series of color points with a first color channel value of 0.75. Now, three of these points are within the gamut with the smallest TAO.

Figure 5:
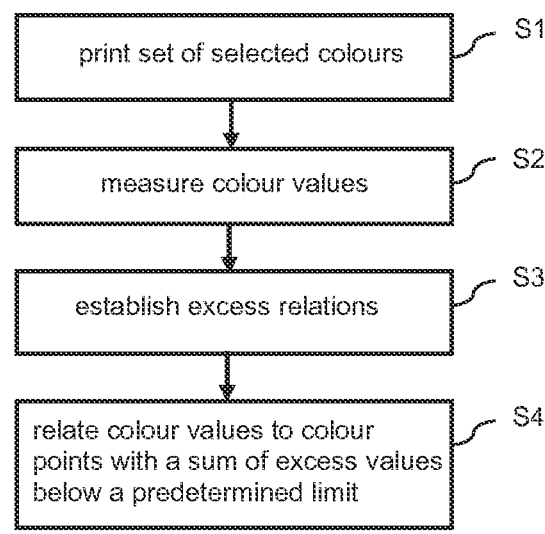
FIG. 5 is a flow diagram for an embodiment of the present invention.

FIG. 5 shows a flow diagram for an embodiment of the present invention. In step S1, a set of selected colors is printed on a print engine for which a profile is to be made. This set may depend on the linearization of the print engine. For example, if the print engine is gray balanced, a different set of colors may suffice compared to the set of colors that is needed when no prior knowledge of the linearization is available. Gray balancing may e.g. be done by the G7 calibration method (http://www.colorwiki.com/wiki/Why_and_How_of_G7_Calibration). All printed colors are measured to obtain a color value (step S2) using a standard photospectrometer, such as one obtainable from X-rite (http://www.xrite.com). For each control value of the available color channels, an excess value relationship, as shown in FIG. 3, is established (step S3), either heuristically or based on a measurement of the amount of colorant applied by the print engine. A sum of the excess values associated with a color point is compared to a predetermined threshold value, such as a TAC value, to determine whether the color that is producible with the color channel values of the color point is within or without the limited gamut, instead of using a sum of control values. The color points and their associated color values that are within the gamut, are used to relate them in a profile, according to a known profiling method, applying gamut mapping to associate color points to color values outside the gamut (step S4).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for making a color transform, that represents a correspondence relation between a first and a second color space, each color space comprising color points for defining a color, each color point comprising a number of color channel values, the method comprising the steps of:

obtaining a set of first color points in the first color space and a set of corresponding second color points in the second color space, wherein a first and a second corresponding color point define a corresponding color;

establishing an excess relation for relating a color channel value of color points in the second color space to an excess value; and making the color transform for a gamut of color points in the second color space by relating color points in the first color space to color points in the second color space, wherein a color point is only included in the gamut if a sum of the excess values related to the color channel values of said color point is lower than a predetermined limit.

2. The method according to claim 1, wherein a gamut mapping algorithm is used to relate color points in the first color space to an alternative color point in the second color space, if the corresponding color point in the second color space is not available, because the sum of the excess values related to the color channel values of the corresponding color point is not lower than said predetermined limit.

3. The method according to claim 1, wherein an excess relation is a non-linear relation between a color channel value and an associated excess value.

4. The method according to claim 1, wherein the second color space is associated with an output device for applying one or more colorants in relation to a color channel value of a color point in the second color space, and wherein the excess relation is based on a relation between an amount of colorant and a color channel value.

5. The method according to claim 4, wherein the output device is a printer having at least two color channels.

6. The method according to claim 5, wherein the color transform is a color profile, the first color space is a device independent color space, and the method comprises the additional steps of:

printing a predefined set of color points in the second color space on the output device to obtain the set of corresponding second color points; and measuring the printed colors to obtain the set of first color points.

7. The method according to claim 5, wherein said predetermined limit depends on a print condition.

8. The method according to claim 7, wherein said print condition comprises a medium type of a receiving material.

9. A non-transitory computer program product, including computer readable code embodied on a computer readable medium, said computer readable code comprising instructions for executing a method comprising the steps of:

obtaining a set of first color points in the first color space and a set of corresponding second color points in the second color space, wherein a first and a second corresponding color point define a corresponding color;

establishing an excess relation for relating a color channel value of color points in the second color space to an excess value; and making the color transform for a gamut of color points in the second color space by relating color points in the first color space to color points in the second color space, wherein a color point is only included in the gamut if a sum of the excess values related to the color channel values of said color point is lower than a predetermined limit.

* * * * *